(12) United States Patent
Mori et al.

(10) Patent No.: US 8,150,895 B2
(45) Date of Patent: Apr. 3, 2012

(54) QUALITY IMPROVEMENT SYSTEM

(75) Inventors: Hiroyuki Mori, Nagaokakyo (JP);
Yoshihiro Nagao, Fukuchiyama (JP);
Yoshiaki Hiraoka, Ohtsu (JP)

(73) Assignee: Omron Corporation, Kyoto (JP)

( * ) Notice: Subject to any disclaimer, the term of this patent is extended or adjusted under 35 U.S.C. 154(b) by 767 days.

(21) Appl. No.: 12/046,897

(22) Filed: Mar. 12, 2008

(65) Prior Publication Data

US 2008/0228307 A1    Sep. 18, 2008

(30) Foreign Application Priority Data

Mar. 14, 2007    (JP) ................ P2007-065265

(51) Int. Cl.
*G06F 7/00* (2006.01)
(52) U.S. Cl. .................................................. 707/809
(58) Field of Classification Search .............. 702/179, 702/181, 185
See application file for complete search history.

(56) References Cited

U.S. PATENT DOCUMENTS

| | | | | |
|---|---|---|---|---|
| 4,644,480 | A * | 2/1987 | Haruna et al. | 702/84 |
| 6,065,133 | A * | 5/2000 | Draber | 714/1 |
| 6,625,511 | B1 | 9/2003 | Suzuki et al. | |
| 7,050,935 | B1 * | 5/2006 | Draber | 702/181 |
| 2005/0028045 | A1 | 2/2005 | Kawaike | |
| 2005/0071029 | A1 * | 3/2005 | Yamamoto et al. | 700/97 |
| 2006/0287911 | A1 * | 12/2006 | Laberge et al. | 705/11 |
| 2007/0033439 | A1 * | 2/2007 | Selvage | 714/26 |
| 2008/0034258 | A1 * | 2/2008 | Moriya et al. | 714/57 |

FOREIGN PATENT DOCUMENTS

| | | |
|---|---|---|
| JP | 05-307661 | 11/1993 |
| JP | 2003-216923 | 7/2003 |
| JP | 2005-038413 | 2/2005 |
| JP | 2005-235130 | 9/2005 |
| JP | 2006-004219 | 1/2006 |
| WO | WO-00/73903 | 12/2000 |

OTHER PUBLICATIONS

Koji et al., International Conference on Engineering Design ICED 05 Melbourne, Aug. 15-18, 2005, pp. 1-15.*
Huang et al., Web-Based Failure Mode and Effect Analysis (FMEA), Computers & Industrial Engineering, 1999, pp. 177-180.*

(Continued)

*Primary Examiner* — Cheyne Ly
(74) *Attorney, Agent, or Firm* — Foley & Lardner LLP

(57) ABSTRACT

A quality improvement system using an FMEA table of the invention includes a defect data collecting unit to collect defect data about a defect in a manufacturing or inspection process and an FMEA table update unit to update the FMEA table online based on the data collected by the defect data collecting unit. The FMEA table includes a failure mode, the number of occurrences of the failure mode, and an effect caused by the failure mode. The FMEA table update unit includes an FMEA table editing unit to edit the FMEA table. The FMEA table editing unit edits the number of occurrences of the failure mode when a row including a set of an occurred failure mode and an effect corresponding to the occurred failure mode is previously defined in the FMEA table, and inserts the row into the FMEA table when the row is not defined in the FMEA table.

1 Claim, 7 Drawing Sheets

OTHER PUBLICATIONS

Huang et al., Synchronous quality function deployment (QFD) over world wide web, Computers & Industrial Engineering, 2002, pp. 425-431.*

Legg, J., Computerized Approach for Matrix-Form FMEA, IEEE Transactions on Reliability, vol. R-27, No. 4, Oct. 1978, pp. 254-257.*

International Journal of Quality & Reliability Management, vol. 13, No. 5, 1996, pp. 8-26.*

Microsoft Corporation, Microsoft Office Excel 2003, pp. 1 and 2.*

Bluvband et al., "Expanded FMEA (EFMEA)," Reliability and Maintainability, Annual Symposium, Jan. 26, 2004, pp. 31-36.

Fournier et al, "Reliability Study of an Automatical Welding Unit," Automation in Manufacturing Industry: Automatic Production Conference, May 1, 1986, pp. 186-190.

Kukkal et al., "Database Design for Failure Modes and Effects Analysis," Proceedings Annual Reliability and Maintainability Symposium, 1993, Jan. 26, 1993, pp. 231-239.

Pollock, "Create a Simple Framework to Validate FMEA Performance." Six Sigma Forum Magazine, Aug. 2005, pp. 27-34, Online, Retrieved From the Internet: URL:http://www.fineainfocentre.com/guides/g.

* cited by examiner

Fig. 3

| Process /61 | Work classification /62 | Work factor /63 | Failure mode /64 | Number of occurrences of failure mode /65 | Effect /66 | Developmental-time measure /67 | Work instruction /68 | Preventive measure /69 | Work instruction /70 | Work instruction achievement /71 | Work performance achievement /72 |
|---|---|---|---|---|---|---|---|---|---|---|---|
| Print | Mask setting | Solder loading | Uneven solder | 1 | Defective fillet | Repair | Instruction 203 | Displaying sample photo | Instruction 104 | 1 | 1 |
| Print | Board positioning | Mark recognition | Dirty mark | 0 | Misaligned component | Disposal | None | None | None | 0 | 0 |
| Print | Squeezing | Solder filling | Dirty mask | 3 | Solder ball | Mask cleaning | Instruction 208 | Review of cleaning cycle | Instruction 108 | 2 | 2 |
| Mount | Mounter setting | Program invoking | Wrong program | 0 | Missing component | Repair/ mounter conformation | None | None | None | 0 | 0 |
| Mount | Mounter setting | Component setting | Component set to wrong position | 2 | Wrong component | Repair/ mounter conformation | Instruction 315 | None | None | 0 | 0 |
| Mount | Component mounting | Component sucking | Worn nozzle | 0 | Missing component | Repair/ mounter conformation | Instruction 402 | Review of periodic maintenance items | Instruction 273 | 0 | 0 |
| Reflow | Temperature elevation | Confirm actual measurement of temperature | Low temperature | 1 | Abnormal wetting | Line stoppage | | Measurement by use of tester upon line start-up | Instruction 302 | 1 | 0 |
| ... | | | | | | | | | | | |

Fig. 5

| Generated fault | Production date/time | Lot ID | Failure mode presence/absence | Work instruction presence/absence | Work performed/not performed | Classification result |
|---|---|---|---|---|---|---|
| Defective fillet | Feb.1, 2007 9:23 | M002345 | Uneven soldering | WGS104 | Performed | (4) |
| Wrong polarity | Feb.1, 2007 15:32 | M002346 | Not applicable | — | — | (1) |
| Abnormal wetting | Feb.2, 2007 9:18 | M002731 | Low temperature | WGS302 | Not performed | (3) |
| Missing component | Feb.2, 2007 11:52 | M002732 | Wrong program | None | — | (2) |
| Damaged component | Feb.2, 2007 14:28 | M002733 | Not applicable | — | — | (1) |

Fig. 6

| Evaluation item | Score |
|---|---|
| Failure mode coverage ratio | 92% |
| Failure mode inhibition ratio | 87% |
| Measure coverage ratio | 73% |
| Measure performance ratio | 61% |

Fig. 7

| Evaluation item | Score | Number of valid cases | | Total number of cases | |
|---|---|---|---|---|---|
| | | Contents | Number of cases | Contents | Number of cases |
| Failure mode coverage | 92% | Number of faults of having failure mode | 34 | Total number of faults | 37 |
| Failure mode inhibition | 87% | Number of failure modes that have not occurred even once | 126 | Total number of failure modes | 145 |
| Measure coverage | 73% | Number of displaying WGS | 25 | Number of occurrences of failure modes | 34 |
| Measure performance | 61% | Number of performing WGS | 15 | Number of displaying WGS | 25 |

Fig. 8

| | | Effect | | | | | |
|---|---|---|---|---|---|---|---|
| | | Defective fillet | Misaligned component | Solder ball | Missing component | Wrong component | Abnormal wetting |
| Failure mode | Uneven solder | O | | | | | |
| | Forgotten disposal of solder | O | | | | | |
| | Loosened mask | | O | | | | |
| | Dirty mark | | O | | | | |
| | Dirty mask | | | O | | | |
| | Wrong program | | | | O | | |
| | Component set to wrong position | | | | | O | |
| | Worn nozzle | | | | O | | |
| | Low temperature | | | | | | O |

QUALITY IMPROVEMENT SYSTEM

This application claims priority from Japanese patent applications P2007-065265, filed on Mar. 14, 2007. The entire content of the aforementioned application is incorporated herein by reference.

BACKGROUND OF THE INVENTION

1. Field of the Invention

The present invention relates to a quality improvement system that uses failure mode and effect analysis (FMEA) and, more specifically, to an easy-to-use quality improvement system that uses FMEA.

2. Description of the Related Art

Conventional quality improvement systems that use FMEA are disclosed in, for example, Japanese Patent No. 3693177 and Japanese Patent Application Laid-Open No. 2006-004219. Japanese Patent No. 3693177 discloses an improvement supporting system that can automatically identify a failure mode based on analysis data, defect occurrence history data, and link data which records a relationship between the analysis data and the defect occurrence history data, thereby evaluating the frequency of the failure mode.

On the other hand, Japanese Patent Application Laid-Open No. 2006-004219 discloses a facilities maintenance system that can automatically create a failure tree analysis (FTA) diagram based on real-time database information of a process monitoring system, derive root causes through day-to-day improvement efforts based on the FTA diagram to thereby create an FTA diagram database, automatically create an FMEA diagram based on the FTA diagram database, and devise a countermeasure plan through day-to-day improvement efforts based on the FMEA diagram to thereby create an FMEA database, thereby using that an FMEA countermeasure plan directly as an maintenance management index.

SUMMARY OF THE INVENTION

The conventional quality improvement systems that use FMEA have been constituted as described above. However, Japanese Patent No. 3693177 describes that it is difficult to decide whether the contents of FMEA are proper and the result of creation once performed cannot easily be updated. On the other hand, Japanese Patent Application Laid-Open No. 2006-004219 describes the automatic creation of an FMEA diagram but not how to create it specifically; so that both of them have a problem that a created FMEA cannot be utilized sufficiently.

In view of the above problems, the present invention has been developed, and it is an object of the present invention to provide a quality improvement system that can utilize an FMEA table sufficiently.

A quality improvement system that uses an FMEA table according to the present invention includes a defect data collecting unit to collect defect data about a defect in a manufacturing or inspection process and an FMEA table update unit to update the FMEA table online based on the data collected by the defect data collecting unit, wherein the FMEA table includes a failure mode, the number of occurrences of the failure mode, and an effect caused by the failure mode, the FMEA table update unit includes an FMEA table editing unit to edit the FMEA table, and the FMEA table editing unit edits the number of occurrences of the failure mode when a row including a set of an occurred failure mode and an effect corresponding to the occurred failure mode is previously defined in the FMEA table, and inserts the row into the FMEA table when the row is not defined in the FMEA table.

BRIEF DESCRIPTION OF THE DRAWINGS

FIG. 3 shows an FMEA table;

FIG. 5 shows a fault occurrence history table;

FIG. 6 shows an FMEA evaluation result;

FIG. 7 shows another FMEA evaluation result; and

FIG. 8 shows association data.

DETAILED DESCRIPTION OF THE PREFERRED EMBODIMENTS

Figure 1:
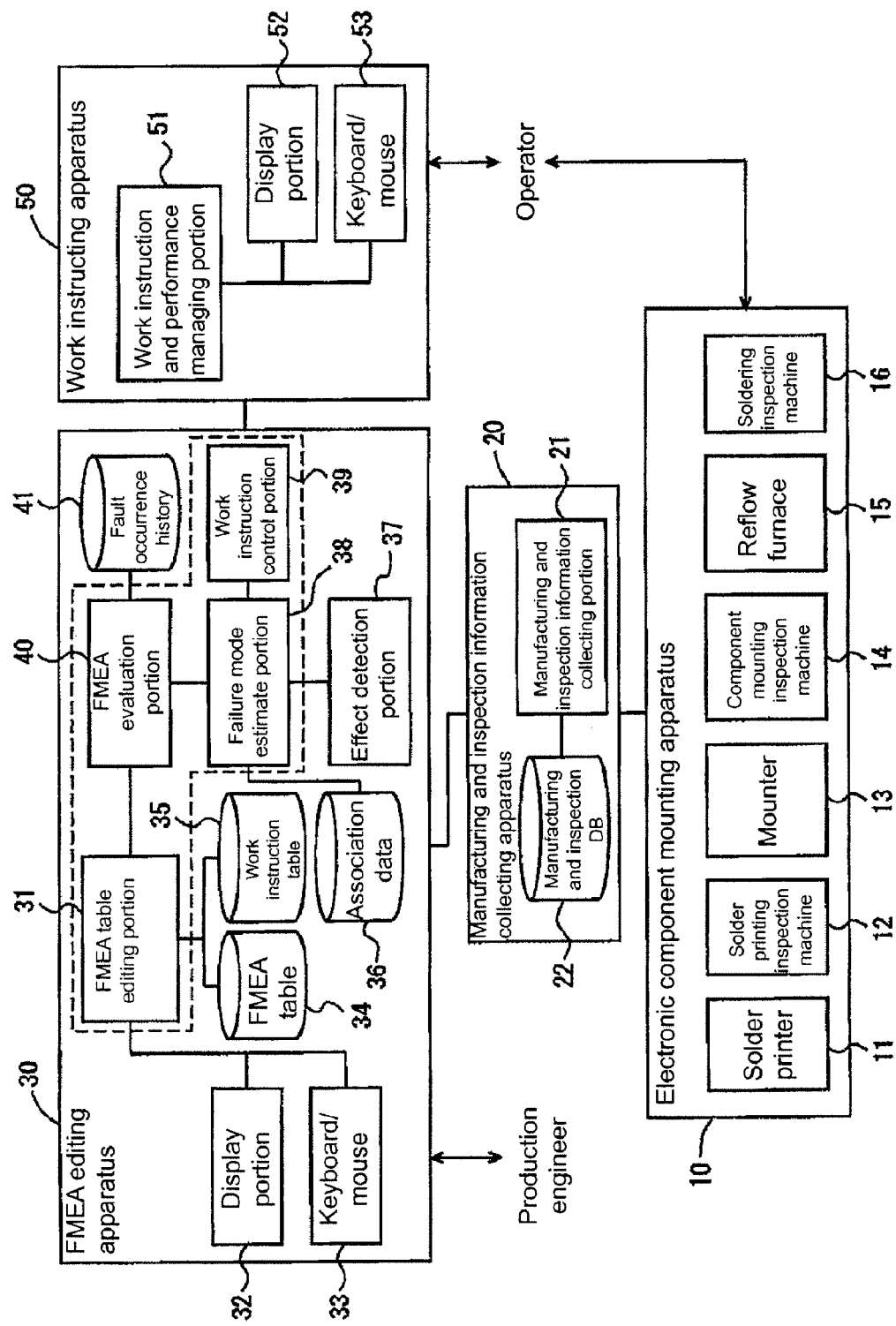
FIG. 1 shows a block diagram of one example of a quality improvement system that uses an FMEA table.

An embodiment of the present invention will be described below with reference to the drawings. FIG. 1 shows the constitution of the surroundings of a quality improvement system that uses FMEA according to the present embodiment in a case where when quality improvement system is applied to an electronic component mounting apparatus. As shown in FIG. 1, the quality improvement system that uses FMEA includes its central FMEA editing apparatus 30 that edits an FMEA table. The FMEA editing apparatus 30 is connected to a manufacturing and inspection information collecting apparatus 20 and a work instructing apparatus 50. The work instructing apparatus 50 receives instructions from the FMEA editing apparatus 30 to displays a work instruction to an operator and also accepts an input from him.

The manufacturing and inspection information collecting apparatus 20 collects inspection data from an electronic component mounting apparatus 10. The electronic component mounting apparatus 10 includes a solder printer 11, a solder printing inspection machine 12 that inspects a post-printing condition, a mounter 13, a component mounting inspection machine 14 that inspects a post-mounting condition, a reflow furnace 15, and a soldering inspection machine 16 that inspects a post-soldering condition, which are arranged from the upstream side to the downstream side of the flow of a board on which electronic components are mounted. The manufacturing and inspection information collecting apparatus 20 includes a manufacturing and inspection information collecting portion 21 that collects manufacturing and inspection data from the electronic component mounting apparatus 10 and a manufacturing and inspection information database 22 that stores data collected by the manufacturing and inspection collecting portion 21.

It is to be noted that the FMEA editing apparatus 30 is a general-purpose computer that has a control portion (which is indicated by a dotted line in the figure) including a CPU, a storage apparatus that has a plurality of databases such as an FMEA table database, and a input/output apparatus such as a display or a keyboard/mouse. In FIG. 1, the features of the control portion are referred to as an FMEA table editing portion 31, an FMEA evaluation portion 32, a failure mode estimate portion 38, and a work instruction control portion 39 respectively. Those features will be described later.

It is to be noted that the control portion functions as an FMEA table update unit, an FMEA table editing unit, a failure mode estimate unit, and a work instruction unit. The display portion functions as display unit.

The FMEA table editing portion 31 manages an FMEA table database 34 that stores an FMEA table and a work instruction table database 35 that stores a work instruction table in which specific work contents to be done by the operator are recorded. To the FMEA table editing portion 31 are connected a display portion 32 serving as the input/output apparatus and a keyboard/mouse 33. The FMEA evaluation portion 40 is connected to a fault occurrence history database 41 that stores a fault occurrence history table. The FMEA table editing portion 31 is connected to the FMEA evaluation portion 40, the FMEA evaluation portion 40 is connected to the failure mode estimate portion 38, the failure mode estimate portion 38 is connected to an association data database 36 that stored association data, an effect detection portion 37 that inputs inspection data and the like from the manufacturing and inspection information collecting apparatus 20, and the work instruction control portion 39 that instructs the work instructing apparatus 50 to work and accepts an input from the work instructing apparatus 50. The failure mode estimate portion 38 estimates a failure mode by referencing association data based on an effect detected by the effect detection portion 37 and instructs the work instructing apparatus 50 to work based on an FMEA table. It is to be noted that the effect detection portion 37 functions as a defect data collecting unit.

The work instructing apparatus 50 includes a work instruction and achievement managing portion 51, to which are connected the display portion 32 serving as the input/output apparatus and the keyboard/mouse 33.

The electronic component mounting apparatus 10 and the work instructing apparatus 50 have their display browsed by the operator and input data in response to a request. The FMEA editing apparatus 30 receives data input etc. from a production engineer.

The electronic component mounting apparatus 10, the manufacturing and inspection information collecting apparatus 20, the FMEA editing apparatus 30, and the work instructing apparatus 50 that constitute the quality improvement system have their components connected online to each other, so that if a defect occurs on the electronic component mounting apparatus 10, its failure mode, developmental-time measure, and preventive measure can be known immediately.

Now, terms used in the present embodiment will be defined as follows. First, the term "FMEA" refers to a failure mode and effect analysis. Its discussion goes on from a cause (failure mode) toward a result (effect). Here, the FMEA need not always be complete an only is necessary to have a failure mode and an effect in a tabular format etc.

The term "FTA" refers to fault tree analysis. It is used to bring discussion from an unlikely glitch (effect in FMEA) toward a case (failure mode in FMEA). Here, the FTA need not always be complete and may be replaced by any method that can identify a failure mode correlated with each of the effects in FMEA or analyzed by a human being. A failure mode may directly be identified for an effect.

The term "failure mode" is one item in FMEA. It refers to a phenomenon that can cause a glitch such as a defect eventually. It may be referred to also as an error mode in process FMEA. It indicates each of faults in the components or mistakes in work. Here, it may be referred to also as a cause or a defect cause.

The term "effect" is one item in FMEA. It refers to an eventual glitch that can be caused by a failure mode. It may be referred to also as a defect or a fault. Further, it may include not only a defect detected by final inspection but also a defect detected in a process. For example, it may include a defect such as "excessive solder" detected by the solder printing inspection machine after a printing process in a surface mounting apparatus.

The term "work instruction table" refers to a work procedure instruction sheet, a work standard, or a work brief. Here, it does not always refer to only what is named a work instruction table but generally indicates a work instruction for the operator (irrespective of whether it is written or oral).

Figure 2:
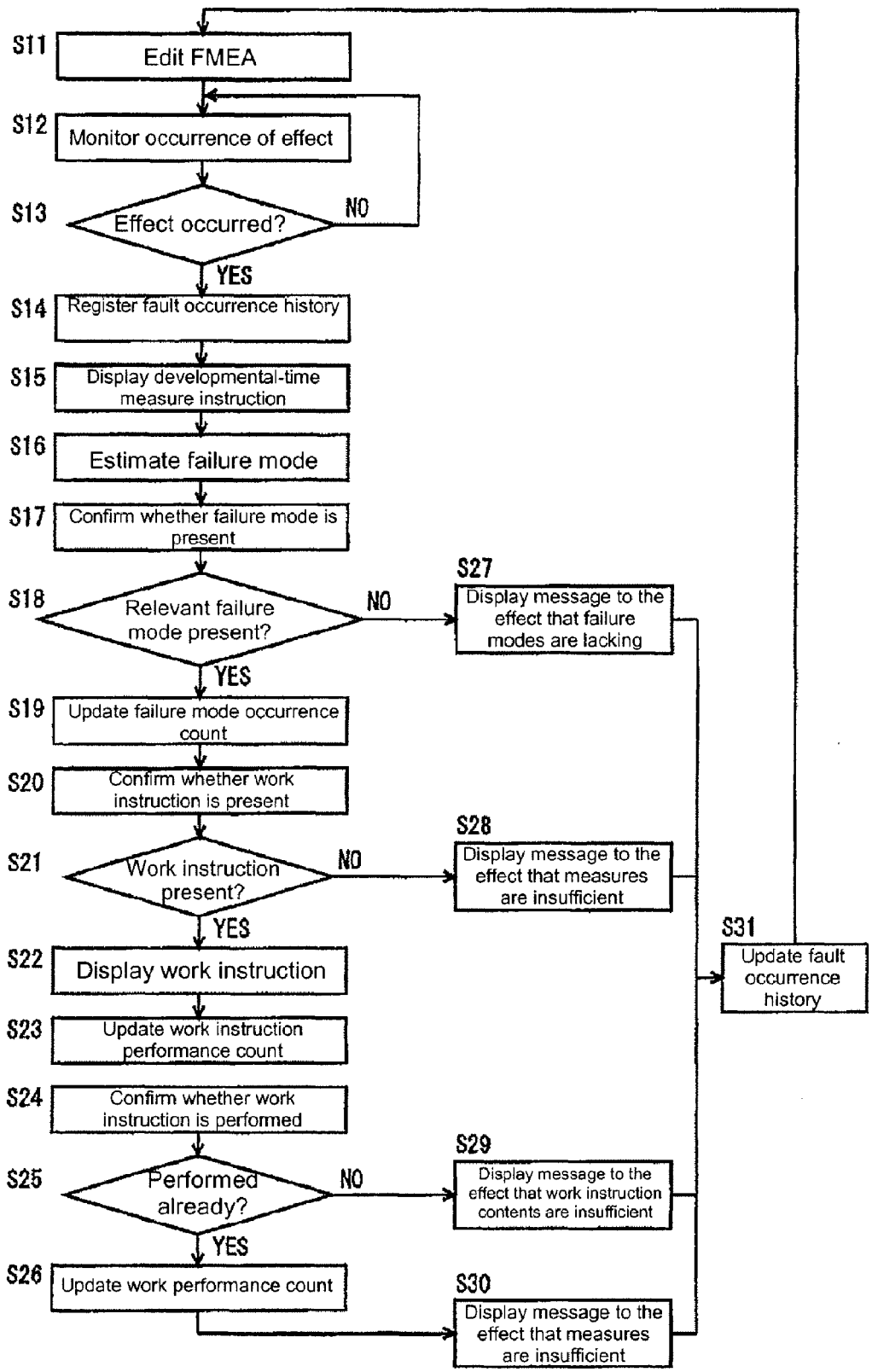
FIG. 2 shows a flowchart of contents to be controlled by a control unit in an FMEA editing apparatus.

Next, the operations of the quality improvement system will be described below. FIG. 2 is a flowchart showing the operations of a control portion (which includes the FMEA table editing portion etc.) in the FMEA editing apparatus 30. First an FMEA table is edited with reference to FIG. 2 (step S11, of which "step" is omitted hereinafter). In this case, the editing of an FMEA table means to newly create an FMEA table or display an FMEA table on the display portion 32 when updating it so that contents may be written to the FMEA table or its contents may be modified using the input device such as the keyboard mouse 33. This operation is performed by the FMEA table editing portion 31. The FMEA table will be described below. One example of the FMEA table is shown in FIG. 3.

As shown in FIG. 3, an FMEA table records each process 61 in an electronic component mounting apparatus, a work classification 62 in the process 61, a work factor 63, a failure mode 64, a failure mode occurrence count 65, an effect 66, a developmental-time measure 67, a first work instruction content 68, a preventive measure 69, a second work instruction content 70, a work instruction achievement count 71, and a work performance achievement count 72. Although the present embodiment will be described in a condition where the developmental-time measure 67 and the first work instruction content 68 are displayed separately from each other, those may be combined into a developmental-time work instruction. This holds true also with the preventive measure 69 and the second work instruction content 70.

It is to be noted that the process 61 refers to each of the processes in electronic component mounting, while the work classification 62 and the work factor 63 refer to the respective work contents in each process. For the failure mode 64 and the like, see the above description. The first work instruction 68 and the second work instruction 70 are each indicated by a work indicating number.

This FMEA table can be easily updated by truncating problems because the developmental-time measure 67 and the preventive measure 69 are written in it separately from each other.

The thus edited FMEA table is used to monitor an effect by using the effect detection portion 37 (S12). The manufacturing and inspection information collecting apparatus 21 collects manufacturing and inspection information from each of apparatuses 11-16 in the electronic component mounting apparatus 10 and registers the result into the manufacturing and inspection information database 22. The effect detection portion 37 collects the information of a failure mode and a defect from the manufacturing and inspection information database 22 in conjunction with production and monitors the occurrence of such failure modes 64 and effects 66 in the FMEA table as to be able to be detected using the manufacturing and inspection information database 22.

It is to be noted that the effects may be monitored not only by this method but also by the effect detection portion 37, which receive the information of occurrence of the failure modes and the defects directly from the electronic component mounting apparatus 10.

If an effect (fault) occurs (YES at S13), this generated fault is registered in a fault occurrence history table (S14). Specifically, if having detected either the failure mode 64 or the effect 66, the effect detection portion 37 registers the generated fault into the fault occurrence history table together with the production and inspection information pieces 61-63 of a product on which that fault has occurred. The fault occurrence history table will be described later.

Next, a developmental-time measure instruction is displayed (S15). If the effect detection portion 37 detects any one of the effects 66 in the FMEA table, the work instruction control portion 39 references a developmental-time measure instruction associated with that effect 66 in the FMEA table and controls the work instructing apparatus 50 to display the contents of that instruction in the work instruction table database 35 storing the work instruction table. The work instruction and achievement managing portion 51 displays the contents on the display portion 52. It is to be noted that the effect 66 in the FMEA table is mutually associated with the contents of a work instruction table related to that effect 66.

Further, this developmental-time measure includes an emergency action.

Next, a failure mode is estimated (S16). The failure mode estimate portion 38 references the association data database 36 to thereby estimate a failure mode that has caused the generated effect. If the effect detection portion 37 has detected a failure mode already, it need not be estimated any more. It is to be noted that this association data database may be any defect cause estimate knowledge database. It is to be noted that association data will be described later.

Next, whether a failure mode is present is confirmed (S17). The FMEA evaluation portion 40 confirms whether the failure mode estimated by the failure mode estimate portion 38 is present in the FMEA table database 34. The contents of FMEA evaluation will be described later.

Next, if it is decided that the failure mode is present (YES at S18), a failure mode occurrence count is updated (S19), as a result of which the FMEA evaluation portion 40 adds 1 to the value of the corresponding failure mode occurrence count column 65 in the FMEA table. Then, it confirms whether a work instruction is present (S20). That is, the FMEA evaluation portion 40 confirms whether a work instruction is given for the corresponding failure mode in the FMEA table.

If a work instruction is present (YES at S21), a preventive measure instruction is displayed (S22). Specifically, the work instruction control portion 39 references the second work instruction 70 for the preventive measure 69 associated with that failure mode in the FMEA table 34 and controls the work instructing apparatus 50 to display the contents of that instruction in the work instruction table database 35. The work instruction and achievement managing portion 51 displays the contents on the display portion 52. In such a manner, the effect 66 in the FMEA table is mutually associated with the second work instruction 70 for a preventive measure related to this effect 66. It is to be noted that the preventive measure includes a permanent measure.

Next, a work instruction performance count is updated (S23). As a result of confirmation on the presence of the work instruction, the FMEA evaluation portion 40 adds 1 to the value of the work instruction achievement count column 71 in the corresponding failure mode row of the FMEA table.

Next, the work instruction control portion 39 confirms whether work is performed (S24). The work instruction and achievement managing portion 51 receives an input from the keyboard/mouse 53 on whether the work instruction is performed.

If it is performed already (YES at S25), the work performance achievement count 72 is updated (S26). Specifically, as a result of the confirmation on performance of the work, the FMEA evaluation portion 40 adds 1 to the value of the work performance achievement column 72 in the corresponding failure mode row of the FMEA table.

Subsequently, an insufficient-measure message is created (S30). That is, if it is confirmed at S24 that a work instruction is performed, an effect has occurred despite the performance of the work instruction, so that the FMEA editing portion 31 displays on the display portion 32 a message to the effect that the measure is insufficient.

On the other hand, if it is decided at S18 that the failure mode is not present in the FMEA table, the FMEA editing portion 31 displays on the display portion 32 a message to the effect that the failure modes are lacking (S27).

Further, if it is decided at S21 that a work instruction is not present (NO at S21), the FMEA editing portion 31 displays on the display portion 32 a message to the effect that the measure and work instruction modes are lacking (S28).

Further, if it is decided at S25 that no work instruction is performed (NO at S25), the FMEA editing portion 31 displays on the display portion 32 a message to the effect that the contents of the work instruction are insufficient (S29).

After the processing of S27-S30 is finished, the fault occurrence history table is updated (S31). Specifically, the FMEA evaluation portion 40 records the information of a failure mode or its presence/absence obtained at S17 in a "Failure mode presence/absence" column, the information of a work instruction or its presence/absence obtained at S20 for the confirmation on the presence/absence of work instructions in a "Work instruction presence/absence" column, and the information of work performed/not performed obtained at S24 in an "Work performed/not performed" column in the corresponding row of "Generated fault" of the fault occurrence history table stored in the fault occurrence history database 41.

Furthermore, if there is no failure mode, information is recorded that tells "the failure mode is not covered"; if there is a failure mode but not work instruction, information is recorded that tells "there is a failure mode not coped with"; if there are a failure mode and a work instruction but not work performance achieved, information is recorded that tells "the measure is difficult to perform"; and if there are a failure mode, a work instruction, and work performance achieved, information is recorded that tells "the measure is improper or insufficient".

Then, the process returns to S11 to repeat the above processing.

In such a manner, in the present embodiment, the effect detection portion 37 can update an FMEA table online based on the manufacturing and inspection information from the manufacturing and inspection information collecting apparatus 20 and, based on an FMEA table, instruct the operator to take measures through the work instructing apparatus 50 in accordance with a failure mode etc.

As a result, it is possible to provide a quality improvement system that can utilize an FMEA table sufficiently. It is to be noted that the above processing may be performed on-the-fly during the operation of the manufacturing processes.

Figure 4:
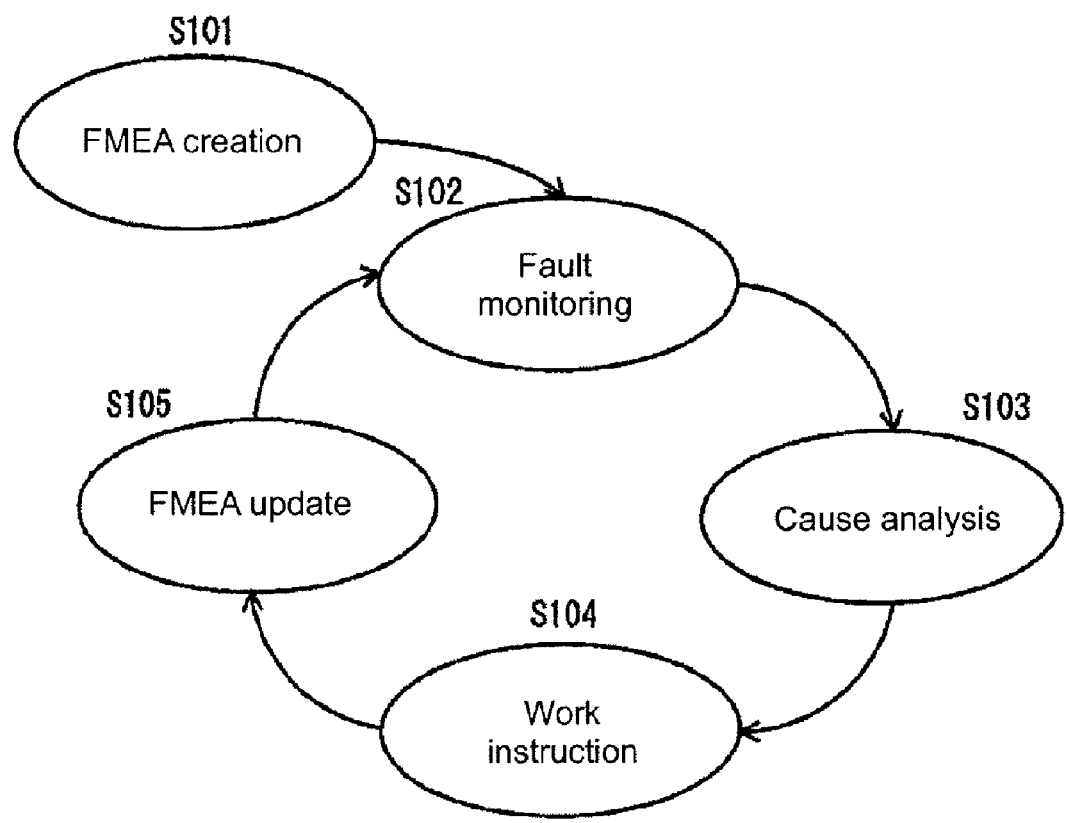
FIG. 4 shows an update cycle for the FMEA table.

Next, a cycle to update an FMEA table will be described below. FIG. 4 is a diagram showing this cycle. As shown in FIG. 4, first an FMEA table is created using the FMEA editing apparatus 30 (step S101, of which "step" is omitted hereinafter). Based on the created FMEA table, the process monitors the occurrence of fault (S102). Specifically, the process monitors the occurrence of effects (defects) by using inspection data from the inspection machines in the electronic component mounting apparatus 10. Subsequently, the process analyzes causes by using association data to identify a failure mode (S103). Next, the process gives a work instruction that corresponds to the failure mode (S104) and records the performance of the work. Then, it updates the FMEA table. Specifically, it extracts the point for improvement of the FMEA table through fault monitoring, cause analysis, work instructing, and work performance and updates the result. It then repeats the above procedure.

As described above, in the present embodiment, inspection data etc. in a manufacturing apparatus can be detected online so that based on the detected data a developmental measure and a preventive measure against a defect may be fed back immediately to revise the FMEA table as going on with production, thereby improving the processes and maintaining the quality.

Next, the aforementioned fault occurrence history table will be described below. FIG. 5 is a table showing an example of data of the fault occurrence history table stored in the fault occurrence history database 41. As shown in FIG. 5, the fault occurrence history table records a production date/time, a lot ID, presence/absence of failure mode, presence/absence of work instruction, performed/not performed of work performance, and a classification result for each generated fault. It is to be noted that the results are classified into four groups of group 1 of uncovered failure modes, group 2 of presence of failure modes not coped with, group 3 of difficult measures, and group 4 of improper measures.

FIG. 6 is a table showing an example of a screen in which an FMEA evaluation result is displayed by the FMEA evaluation portion 40 on the display portion 32. As shown in FIG. 6, the results of FMEA evaluation includes evaluated items of a failure mode coverage ratio, a failure mode inhibition ratio, a measure coverage ratio, and a measure performance ratio all in percentage. Every item should preferably be higher in score.

The FMEA evaluation results are calculated as follows.

Failure mode coverage ratio=(number of cases of faults having failure mode)/(total number of faults cases)

Failure mode inhibition ratio=(number of failure modes that have not occurred even once)/(total number of failure modes)

Measure coverage ratio=(number of displaying the corresponding work instruction)/(number of occurrences of failure modes)

Measure performance ratio=(number of performing the corresponding work instruction)/(number of displaying the corresponding work instruction)

Next, an example will be described below which indicates the details of the results of FMEA evaluation. FIG. 7 is a table showing another example of the details of FMEA evaluation results. In this example, as the results of FMEA evaluation, for each of items to be evaluated, besides a score, the number of valid cases and the total number of cases are shown, against which the number of specific cases is given. For example, if the number of cases is small, it is not so meaningful even if the score is high. To solve it, by thus showing the details, the number of specific cases can be known, so that the user can easily understand the evaluated contents.

Next, an example will be described below of an FTA table stored in the association data database 36. FIG. 8 is a table showing an example of the FTA table that utilizes a matrix. As shown in FIG. 8, the FTA table shows a matrix of the specific contents of the failure modes and the effects generated by them. In the table, a combination of a specific example of the failure mode and a specific example of the corresponding effect is indicated by a circle in the matrix. For example, uneven soldering causes a defective fillet.

By using such a table, first a defect as an effect is detected by the effect detection portion 37 from the manufacturing and inspection information collecting apparatus 20, to select an effect item in its horizontal line. In a column thus selected, a row indicated by a circle is selected. A failure mode in that row is output as a result to the failure estimate portion 38. Since the FTA table is thus configured, if an effect is detected by the effect detection portion 37, the corresponding failure mode can be easily estimated by the failure mode estimate portion 38 from the FTA table stored in the association data database 36.

Although the above embodiment has been described with reference to a case where a matrix is used, the present invention is not limited to it; as association data, an arbitrary table for estimation of defect causes may be employed.

As described above, an FMEA table is updated on-the-fly based on collected defect data, so that the most recent information about defects is stored in the FMEA table always. Therefore, any one can utilize this FMEA table. As a result, it is possible to provide a quality improvement system that can utilizes FMEA sufficiently.

Although the embodiment of the present invention has been described with reference to the drawings, the present invention is not limited to the illustrated embodiment. The illustrated embodiment can be modified and changed variously within the same scope as or an equivalent scope to that of the present invention.

What is claimed is:

1. A quality improvement system using an FMEA table, the system comprising:
   a defect data collecting unit configured to collect defect data about a defect in a manufacturing or inspection process;
   an FMEA table update unit configured to update the FMEA table online based on the data collected by the defect data collecting unit; and
   a work instructing apparatus that displays a work instruction to an operator,
   wherein the FMEA table includes a failure mode, the number of occurrences of the failure mode, and an effect caused by the failure mode;
   wherein the FMEA table update unit includes an FMEA table editing unit to edit the FMEA table, the FMEA table editing unit configured to edit the number of occurrences of the failure mode when a row including a set of an occurred failure mode and an effect corresponding to the occurred failure mode is previously defined in the FMEA table, and to insert the row into the FMEA table when the row is not defined in the FMEA table;
   wherein the FMEA table update unit includes a failure mode estimate unit configured to estimate the failure mode based on the effect that corresponds to the defect data collected by the defect data collecting unit,
   wherein the failure mode estimate unit has association data that indicates association between the defect data and the failure mode;
   wherein the failure mode estimate unit is configured to estimate the failure mode respective to the defect data collected based on the association data
   wherein the FMEA table includes the work instruction that corresponds to the failure mode,
   wherein the FMEA table update unit notifies the work instructing apparatus of the work instruction,
   wherein the work instruction includes a first work instruction and a second work instruction;

wherein the first work instruction includes an emergency action for the manufacturing or inspection process and a specific work instruction about treatment of a product being manufactured;

wherein the second work instruction includes a work instruction in relation to a work standard of the manufacturing process;

wherein the failure mode estimate unit controls the work instructing apparatus to display the defect data based on the FMEA table when the defect data collecting unit detects the defect data and the failure mode estimate unit identifies a corresponding work instruction or the failure mode; and wherein the work instructing apparatus includes a control unit for inputting by an operator a result showing whether a work corresponding to a displayed work instruction has been done or not and for recording the result into the FMEA table, the system further comprising:
an FMEA evaluation unit to evaluate the FMEA table by calculating at least one of:
a ratio of the number of editing the number of occurrences of the failure mode with respect to a total number of occurrences of the defects;
a ratio of the number of the failure modes that have not occurred even once with respect to a total number of the failure modes;
a ratio of the number of displaying the corresponding work instruction with respect to the number of occurrences of the failure modes; or
a ratio of the number of times the work corresponding to the displayed work instruction has been done with respect to the number of times the work instruction is displayed.

* * * * *